United States Patent [19]

Raudys

[11] Patent Number: 4,525,895
[45] Date of Patent: Jul. 2, 1985

[54] ARTICLE FOR USE IN AUTOMATICALLY AND CONTINUOUSLY MAKING STUFFED CASING PRODUCTS

[75] Inventor: Vytas A. Raudys, Chicago, Ill.

[73] Assignee: Union Carbide Corporation, Danbury, Conn.

[21] Appl. No.: 448,349

[22] Filed: Dec. 9, 1982

[51] Int. Cl.³ .............................................. A22C 11/00
[52] U.S. Cl. ........................................ 17/1 R; 17/41; 138/118.1; 426/513; 53/129
[58] Field of Search ...................... 17/41, 42, 33, 49; 138/118.1, 109; 206/802; 426/512, 513, 138, 140, 106; 53/129, 137, 415, 474; 141/313

[56] References Cited

U.S. PATENT DOCUMENTS

| 2,654,121 | 10/1953 | Nelson | 17/32 |
| 2,669,749 | 2/1954 | Hovland | 17/35 |
| 2,886,073 | 5/1959 | Beck | 141/313 |
| 3,777,331 | 12/1973 | Falborg | 17/32 |
| 3,808,638 | 5/1974 | Kupcikevicius et al. | 17/35 |
| 4,007,761 | 2/1977 | Beckman | 138/103 |

Primary Examiner—Willie G. Abercrombie
Attorney, Agent, or Firm—Roger Aceto

[57] ABSTRACT

A magazine for containing a plurality of flattening discs which can be introduced over a stuffing horn and into a casing during the stuffing thereof to produce a stuffed casing product having two substantially flat ends. The magazine is loaded with a plurality of such discs and maintains the discs in an ordered array. The magazine is easily mounted to a stuffing apparatus and facilitates the feeding of the discs into the casing to permit the continuous and automatic production of a plurality of flat-ended stuffed casing products from a single, continuous length of casing.

29 Claims, 9 Drawing Figures

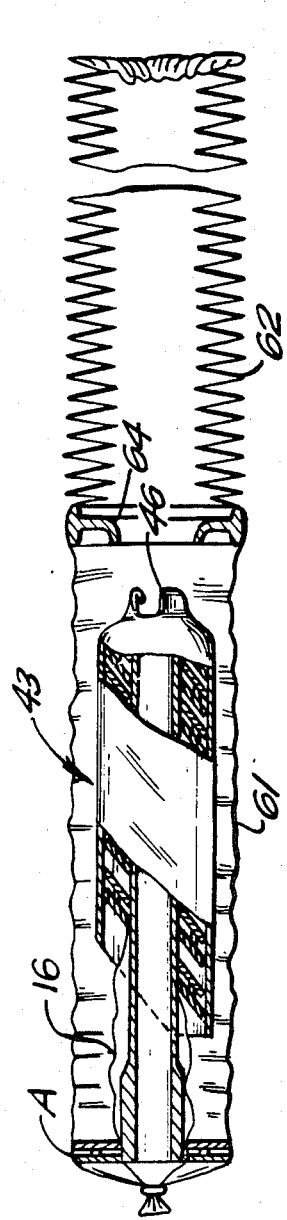
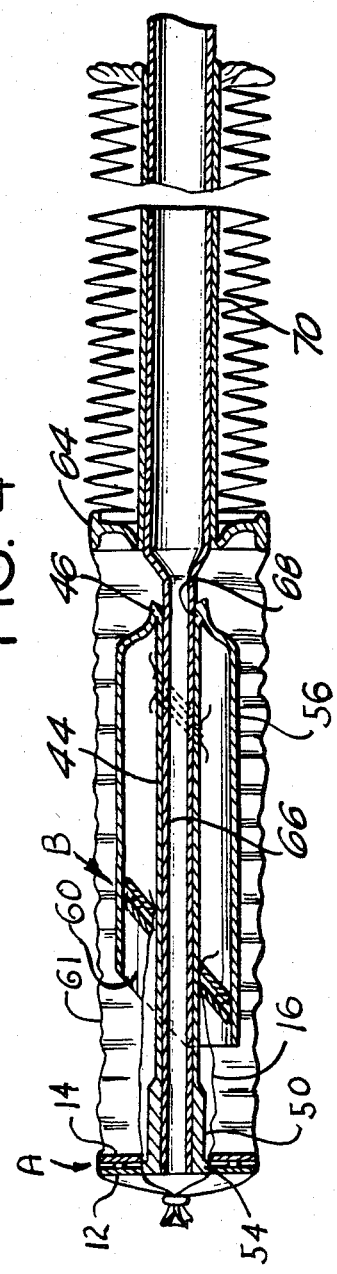
FIG. 4
FIG. 5

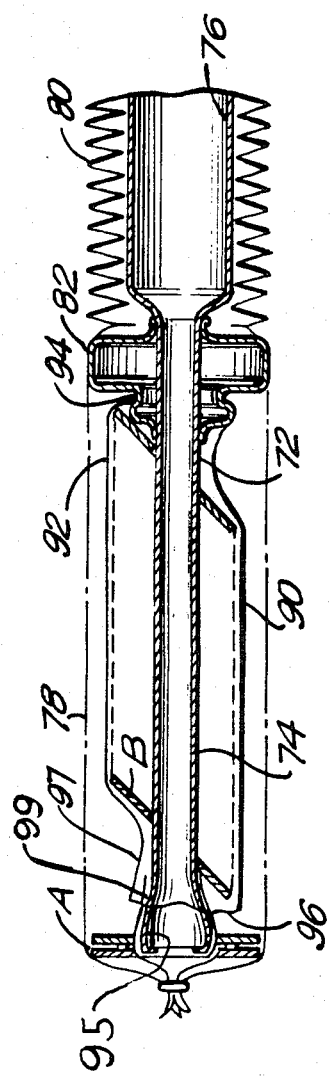
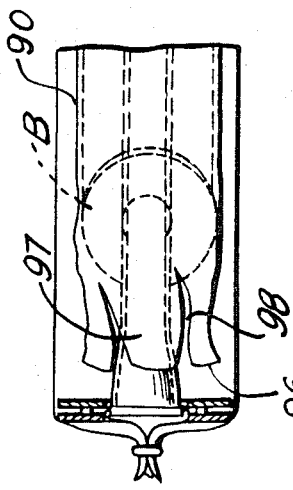
FIG. 6
FIG. 7

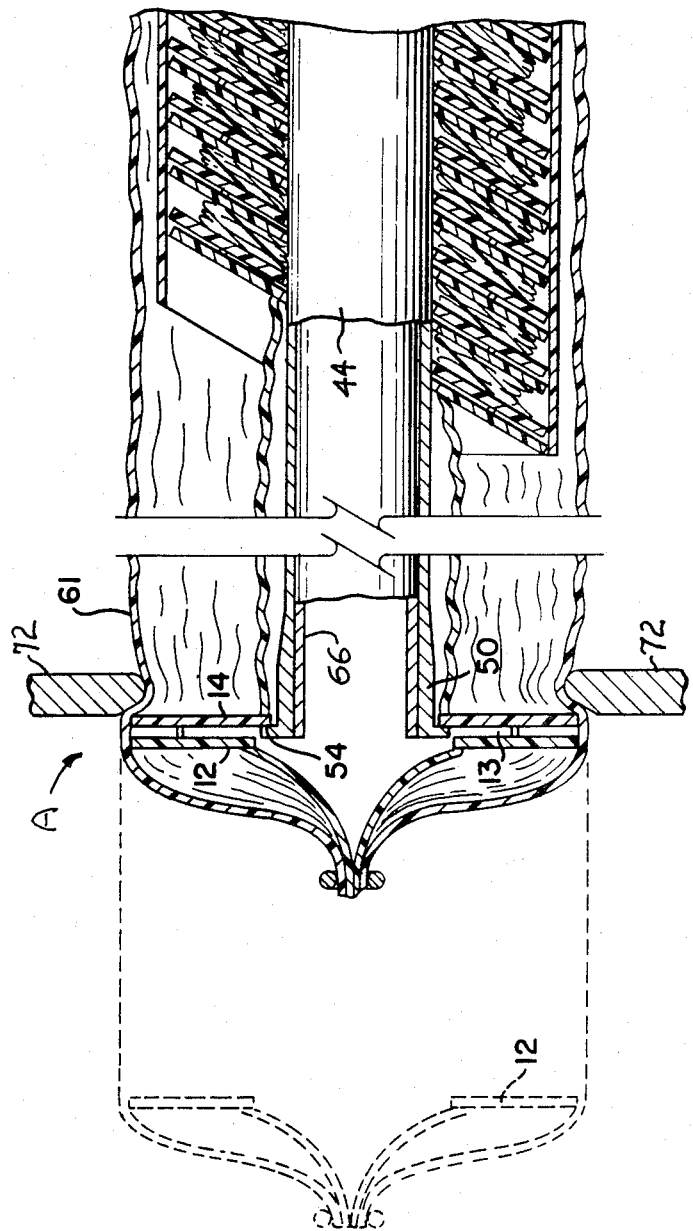

ARTICLE FOR USE IN AUTOMATICALLY AND CONTINUOUSLY MAKING STUFFED CASING PRODUCTS

RELATED APPLICATIONS

The following patents and applications are related to, and were filed on the same date as, the instant application:

U.S. Pat. Nos. 4,466,463; 4,466,464; 4,466,465; 4,466,466; 4,466,984 and Ser. No. 430,230.

FIELD OF THE INVENTION

This invention relates generally to the production of large, stuffed casing, sausage-type products made of meat emulsion or meat chunks, such as bologna sausage, ham or turkey loaf and the like, or to the production of other encased food products such as whole boneless hams. More specifically, the invention relates to an article useful in automatically and continuously producing such stuffed casing products having flat ends.

BACKGROUND OF THE INVENTION

Large sausage casings are generally manufactured from materials such as regenerated cellulose, or regenerated cellulose having fibrous webs embedded therein, and are employed in the manufacture of large sausage products such as salami and bologna sausages, spiced meat loafs, cooked and smoked ham butts, and the like. Such products may range up to 6½ inches in diameter and lengths may vary from 14 to 72 inches and longer. One way to make such products is to utilize cut lengths of casing having flat widths ranging in size from about 2 to about 15 inches. Some stuffing systems still utilize cut lengths of casing, but such systems do not lend themselves to continuous operation due to the relatively short length of the cut casing.

In recent years, systems for automatically stuffing meats and food emulsions into casings in a continuous fashion have been widely used in the art. Such systems are disclosed, for example, in U.S. Pat. No. 4,007,761 and U.S. Reissue Pat. Nos. 30,265 and 30,390. These systems commonly employ shirred tubular cellulosic food casings as disclosed, for example, in U.S. Pat. Nos. 2,983,949 and 2,984,574 to Matecki.

The systems as disclosed in the above mentioned Reissue Patents have advanced considerably the art of preparing, on an automatic and continuous production basis, stuffed casing products which are substantially uniform in size, shape and quality. These systems use casing lengths of up to 250 feet to manufacture, in a continuous operation, stuffed products of a desired, predetermined length ranging from 14 to 72 inches each or longer. Specifically, these systems utilize shirred casing lengths, and include means to regulate the shape and conformation of the leading and trailing closed ends of the product in relation to the predetermined recommended stuffed diameter for a given size of casing.

After stuffing, the product is cooked or cured according to conventional processes. Many of the large sausage-type products are thereafter sliced and packaged into units of predetermined weight and slice count for retail sale. The slicing devices employed in such packaging operations are pre-set to yield a specific weight-by-slice count for use in obtaining unit packages of equal weight.

In order to produce uniform slices for as much of the full length of the product as possible, it is desirable that the closed leading and trailing ends of the product be substantially flat. However, until recently, stuffed casing products as made from a continuous length of casing all had at least one, and usually two generally hemispherical or rounded ends. These rounded ends of the product are generally not suited for use in producing uniform slices for the equal weight packages as sold in the retail trade. Consequently, the rounded ends are sliced off and product contained in these rounded ends is reworked. The term "rework" refers to product which is reprocessed for use in a subsequent batch of food emulsion.

In order to minimize the rework resulting from these rounded ends, many prior attempts have been made to flatten them by utilizing a variety of methods and apparatus. While such attempts have attained some degree of success, none has proved to be entirely satisfactory. For example, U.S. Pat. No. 3,808,638 discloses a method for producing large sausage products having one pre-flattened end. This method does reduce the sausage end rework by one-half, but substantial rework is still present in the non-flattened end. As a further example, U.S. Pat. No. 3,777,331 discloses a method and apparatus for producing encased sausage with two flat ends whereby the end pieces are inserted in a non-fully automatic fashion. The particular method and apparatus as disclosed in the '331 Patent is limited to the use of continuous lengths of non-shirred casing, and does not lend itself to efficient commercial operation.

Reducing the incidence of rounded ends and consequently reducing the amount of rework can be accomplished by increasing the length of the stuffed product. However, exceedingly long lengths of stuffed product are not practical for various reasons, including, for example, the limitations of the stuffing apparatus, the apparatus for handling and transporting the stuffed product, the cookers, and the slicing apparatus. Thus, there are upper limits to lengths of stuffed product which can be reasonably and economically processed, so that the most practical way of reducing rework resulting from rounded ends is to provide as flat an end as possible.

In an invention which is the subject of a copending application, Ser. No. 430,442 filed Sept. 30, 1982, now U.S. Pat. No. 4,466,984, there is provided an extender article in the form of connected annular flattening discs. The discs are designed so that they can be introduced over the stuffing horn and into a casing during the stuffing operation to substantially flatten both ends of the stuffed casing product. The present invention is directed to a magazine structure for holding a plurality of the extender articles. The magazine not only facilitates mounting to a stuffing horn of an automatic stuffing machine, but also maintains the orientation of the discs in an ordered array. This permits the discs to feed from the magazine so that flat ended stuffed casing products can be produced from lengths of shirred casing continuously and automatically, without interruption, until either the length of shirred casing, or the supply of the extenders contained in the magazine, is spent.

Accordingly, it is a primary object of the present invention to provide a magazine that is useful in producing stuffed casing products, and particularly, large sausage products, with flat ends, from shirred casings.

Another object of the present invention is to provide a magazine for containing a plurality of annular discs as may be used in the continuous and automatic production of flat-ended sausage-type products.

Still another object of the present invention is to provide such a magazine as can be mounted to a stuffing machine, for introducing the discs into the casing to be stuffed.

A further object of the present invention is to provide such a magazine as may contain an ordered array of annular discs, the magazine being adapted for maintaining the order and orientation of the discs during a fully automatic, continuous stuffing operation.

These, and other objects of the present invention will become apparent from a reading of the specification.

SUMMARY OF THE INVENTION

The present invention may be characterized in one aspect thereof by the provision of a magazine for holding a plurality of extender discs used to flatten the ends of stuffed casing products, the magazine including:

(a) an elongated tubular mandrel having an aft end and a fore end;

(b) a longitudinally extending outer support member disposed about at least a portion of the mandrel so the fore end of the mandrel extends out from the support member, the outer support member being of a size sufficient to fit within a casing to be stuffed; and (c) the mandrel and outer support member defining a space therebetween which is open towards the fore end of the mandrel, the space being adapted to nest a plurality of generally flat annular discs received and stacked on the mandrel for movement along the mandrel out of the space and towards the fore end.

In another aspect, the magazine of the present invention includes:

(a) an elongated tubular mandrel having a fore end and an aft end;

(b) a connector for detachably mounting the mandrel to a stuffing apparatus such that the food product being stuffed passes through said mandrel;

(c) an outer support member disposed about at least a portion of the mandrel, the outer support member and mandrel defining a space therebetween which is open toward the fore end, the outer support member being of a size sufficient to permit passage of a casing to be stuffed over and about the support member; and (d) a plurality of substantially flat annular discs stacked in an array one against another over the mandrel and into the space, the discs being movable from the array and along said mandrel from a first, stored position within the space, to a second, ready-to-use position out of the space and adjacent the fore end.

The invention also can be characterized by a combination of:

(a) an elongated receptacle having an open fore end and a closed aft end, the closed aft end having a central opening;

(b) the receptacle being elliptical in cross section;

(c) a plurality of circular discs stacked within the receptacle, the discs having an outside diameter greater than the minor axis of the elliptical cross section so that the stack of discs is tilted in the receptacle; and (d) each of the discs having a central opening aligned with the opening in the aft end, the aligned openings defining a passage extending axially through the stacked array of discs.

In still another aspect, the invention involves the combination of:

(a) a plurality of flat, circular discs arranged in a stacked array, each of the discs having a central opening which align to form a passage extending axially through the stacked array;

(b) an elongated tubular mandrel extending through the passage for supporting the stacked array of discs, the mandrel in cross section being generally elliptical and each of the disc openings being circular, the size relationship of the elliptical cross section and the diameter of each circular opening being such that the stacked array will be maintained in a slanted orientation on the tubular mandrel with respect to the longitudinal axis of the mandrel.

DESCRIPTION OF THE DRAWINGS

FIG. 4 shows the package article of FIG. 3 and a casing sizing means implanted in the unshirred portion of a shirred casing;

FIG. 5 shows the package article and shirred casing of FIG. 4 in place on a stuffing horn assembly;

FIG. 6 is a view similar to FIG. 4, showing another embodiment of the magazine;

FIG. 7 is a top view of a portion of the embodiment shown in FIG. 6; and

FIG. 8 is a view on an enlarged scale showing a portion of the package article in an operative position.

DESCRIPTION OF THE PREFERRED EMBODIMENT

Figure 1:
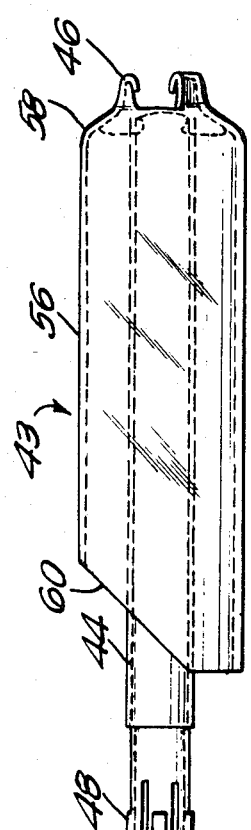
FIG. 1 is a side elevation view partly broken away and in section showing one embodiment of the magazine of the present invention.
Figure 2A:
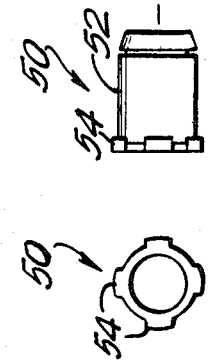

Referring to the drawings, FIG. 1 shows a magazine, generally indicated at 43, as may be used to contain a supply of extender discs.

The extenders form no part of the present invention and are described in more detail in the aforemention U.S. Pat. No. 4,466,984 It is sufficient for the purposes of the present invention, merely to say that the term "extender" or "flattening disc" as used herein designates a substantially flat disc, which, when inserted at either end of a stuffed product, will flatten the ends thereof to provide a product that is substantially the shape of a right circular cylinder.

When used in the making of a finished food product of relatively large diameter (2 to 7 inches) of the type which, after processing, is sliced and then sold in package form, the extenders will flatten or at least partly flatten the ends of such product from the conventional rounded configuration, thereby reducing the rework needed to reprocess the portion of the food product which would otherwise be contained in rounded ends.

Preferably each extender would be generally, the shape of a relatively flat, annular disc so that a plurality of the discs can be mounted over a stuffing horn. In operation, a pair of the extender discs are moved to the outlet of the stuffing horn and into the casing to be stuffed. Food emulsion, introduced through the horn and into a space between the two extender discs, causes the discs to separate, thereby forming the flat-ended, casing stuffed product.

The present invention is directed to a magazine for containing a plurality of the extender discs and for maintaining them in a compact, ordered array and at a proper orientation for a stuffing operation. The magazine facilitates both the mounting of a plurality of the discs to a stuffing horn, and the feeding of the discs into a proper position during the stuffing cycle.

FIG. 1 shows a magazine arrangement which facilitates the use of the extenders for continuous production of large sausage products having flat ends. In FIG. 1 a magazine for orienting and holding a compact, ordered array of extender discs is shown generally indicated at 43. This magazine includes an inner support member 44, such as a mandrel or support tube, which can be mounted to a stuffing horn assembly of a stuffing machine so that the product to be stuffed passes through the mandrel.

A conventional stuffing machine, which may be modified to accept the magazine as described herein, is shown in U.S. Reissue Pat. No. 30,390. A preferred stuffing apparatus and method of operation is disclosed in a copending application Ser. No. 430,230 filed Sept. 30, 1982. As neither the stuffing machine nor its method of operation per se form any part of the present invention, only parts of such an apparatus and its method of operation will be shown and described hereafter, as may be necessary to a complete understanding of the present invention.

The forward end of mandrel 44 is provided with a quick-connect means 48 which can be snap connected to a separate nose piece generally indicated at 50. The separate nose piece is required to facilitate the loading of an array of the extender discs onto the mandrel 44. In this respect, the array is loaded first and then the nose piece is snapped onto the forward connector means 48 to capture the array on the mandrel.

The nose piece includes a ramp portion 49 and a body portion 52.

The body portion 52 of the nose piece is slightly larger in diameter than mandrel 44 so that ramp portion 49 provides for a smooth transition from the mandrel to the body of the nose piece.

Even though it is larger, the diameter of the nose piece body portion 52 is still small enough to permit passage of the pairs of discs as may be contained within the magazine.

On the forward end of the nose piece is an interrupted flange 54. The outside diameter of the flange is small enough to pass a leading, or first extender disc of each extender pair as may be moved to the outlet of the stuffing horn, yet is large enough to catch a trailing, or second extender disc of each pair.

While the trailing, or second extender will not readily pass over the interrupted flange 54, the inner periphery of the trailing extender and/or the flange 54, can be designed to flex so that when the trailing extender and/or the flange 54, is subjected to a sufficiently large axial force, the second, or trailing extender of the pair can be forced over the flange and off of the nose piece.

Magazine 43 also includes an outer support member 56, such as a sleeve or housing, disposed about a portion of the mandrel 44. The outer support member extends longitudinally of, and preferably completely surrounds a portion of, the mandrel as shown. However it can also take the form of a trough, cage, open mesh, lattice or other structure sufficient to maintain the orientation and order of the discs. The outer support, hereafter referred to as sleeve 56, is at least partly closed at its rear 58, which is either attached to, or formed integral with, the aft end of the mandrel. The front of the sleeve is open at 60 to permit the loading of the extender discs onto the mandrel and into the sleeve. The sleeve 56 thus forms a protective overwrap or housing for the array of extender discs mounted on the mandrel.

In construction, the sleeve can either be a rigid member as shown or a semi-rigid or flexible overwrap or flexible netting. If rigid, the open end 60 of the sleeve should have its upper end cut away to form the angled exit as shown. If a semi-rigid or flexible overwrap is used, the open end of the sleeve preferably is split as shown in FIGS. 6 and 7. The purpose of both constructions will be discussed further hereinbelow.

To complete the construction, a quick-connect means 46, which can be part of either the mandrel 44 or sleeve 56, is provided for connecting the magazine to a stuffing horn assembly.

Figure 3:
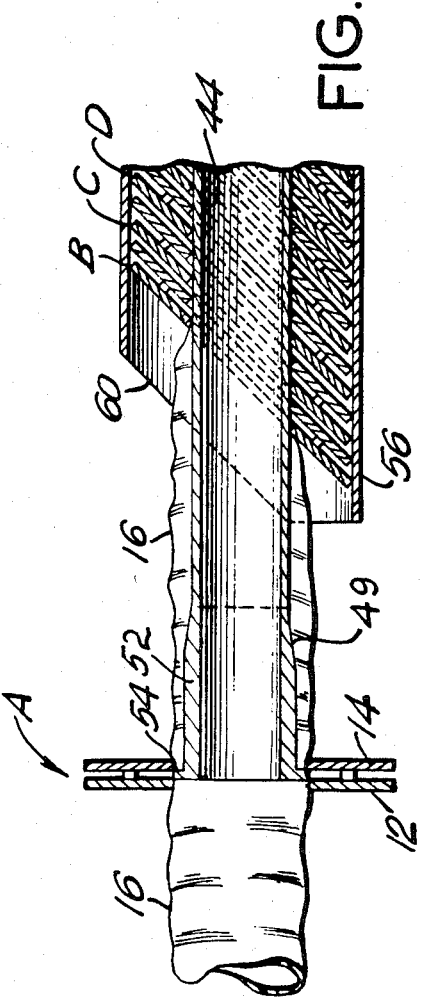
FIG. 3 is an elevation view, in section, showing a portion of the FIG. 1 magazine as filled with an ordered array of connected extender discs to provide a package article.

To load magazine 43, the extender discs are arranged in pairs (identified as A, B, C, etc. in FIG. 3). Each pair includes a leading disc 12 and a trailing disc 14 which are snapped together. The pairs, in turn, are connected one to another by a flexible membrane 16. This membrane folds between adjacent disc pairs to form a relatively compact array of connected extender disc pairs. The array of connected disc pairs is stacked on mandrel 44 and nested into the housing formed by sleeve portion 56.

Preferably, for purposes more fully set out hereinbelow, the entire array of the paired extender discs within sleeve 56 is slanted, or tilted on the mandrel as shown in FIG. 3. This allows the sleeve to be generally elliptical in vertical cross section (see FIG. 2) because the projection of the round, but tilted, array of paired extender discs onto a plane normal to the mandrel axis, is an ellipse.

For the same reason, mandrel 44 can also be elliptical in cross section because the projection of the round hole of a tilted disc is also an ellipse. If mandrel 44 is not elliptical, it should have an outside diameter which is smaller than the opening through each annular extender disc in order to permit the desired tilting of the discs. Either arrangement facilitates mounting the array on the mandrel as shown in FIG. 3. However, making the mandrel elliptical in cross section not only allows the desired tilting, but also maximizes the cross sectional area of the mandrel, which facilitates the stuffing operation.

Figure 2:
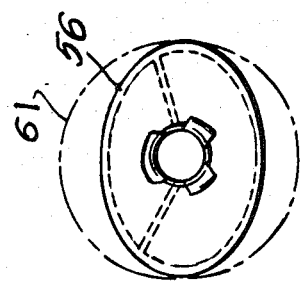
FIG. 2 and FIG. 2(a) are end views of the FIG. 1 magazine.

It is preferred to tilt the array of extender discs within sleeve 56 because the casing to be stuffed, as is shown at 61 in dotted line in FIG. 2, usually will have a diameter generally equivalent to or slightly less than the diameter of an extender disc. Thus, the tilting of the array of extender discs as described, permits the elliptical sleeve 56 to have a minor axis which is smaller than the diameter of the casing into which the magazine is fitted. This considerably reduces the area of surface contact between the magazine and casing. Reducing this contact will allow the casing to be drawn over and about the magazine during the stuffing operation with minimal drag or retardation of movement. The major axis of the elliptical sleeve preferably is at least equal to the diameter of the casing in order to accomodate a disc having a diameter as set out above. While the array can be tilted either forward or aft, it is preferred to tilt the array in a rearward, or aft direction as shown in the Figures.

After the array of paired extender discs is loaded onto the support tube or mandrel 44, the nose piece 50 is snapped onto the mandrel via quick connect means 48 to capture the extender pairs on the mandrel. As shown in FIG. 3, the first pair A of the extender discs, is then moved onto the nose piece and oriented in an upright position, that is, perpendicular to the axis of the mandrel, in preparation for use. With the discs in the upright position, the casing to be stuffed can be drawn tightly over the outer edge of the discs (FIG. 4) while the rest of the extender discs remain tilted in a stored position within sleeve 56.

As described hereinabove, the nose piece body portion 52 is larger in diameter than mandrel 44. Accordingly, when extender discs are located on the nose piece, body portion 52 fills a larger portion of the central opening in each disc than does mandrel 44. This tends to promote the upright orientation of the extender discs since the reduced clearance between the discs and body portion acts to prevent any appreciable tilting of the discs on the nose piece.

The transition of the extender discs from a tilted position on mandrel 44 within sleeve 56, to an upright position or ready-to-use position on nose piece body portion 52, is facilitated by ramp portion 49. In cases where the mandrel is elliptical in cross section, the ramp facilitates the transition from such elliptical shape to the circular cross section of the nose piece body portion.

In FIG. 3, reference 16 identifies a flexible tubular membrane which is not part of the present invention, but which is a component of the extender discs carried by magazine 43. As is more particularly described in U.S. Pat. No. 4,466,984, one function of this membrane is to assist in moving a pair of the extender discs from a stored position within sleeve 56 to a ready-to-use position on the nose piece body portion 52. This membrane will be referred to hereinbelow in the context of the use of the magazine during the casing stuffing operation.

In use, magazine 43 with its load of extender disc pairs A, B, C, etc., as shown in FIG. 3, can be mounted on a stuffing horn assembly via quick connect means 46. An unshirred portion of casing 61 (see FIG. 2) from a casing supply is then pulled over the magazine. The casing is then clipped closed together with the loose portion of tubular membrane 16 connected to the first upright extender disc pair A, to start an automatic stuffing operation as will be described briefly hereinbelow.

If desired, the entire magazine 43 and its stored array of extender discs can be inserted into an unshirred portion of a shirred casing stick to provide a shirred casing article as shown in FIG. 4. In this respect, FIG. 4 shows the magazine 43 of FIGS. 1-3 disposed inside an unshirred portion 61 of a shirred casing stick 62. FIG. 4 also illustrates that even though the casing is tightly drawn about the upright discs, considerable clearance exists between the casing and the magazine containing the stored array of tilted discs, the magazine being elliptical in vertical cross section.

Preferably, the casing stick also contains a sizing means 64 implanted in the unshirred portion 61 of the stick intermediate the aft end of magazine 43 and the shirred portion of the shirred casing stick. The sizing means 64 may take the form of a sizing disc as is coventional in the art. Such a sizing disc and its functions are more particularly described, for example, in U.S. Pat. Nos. 4,007,761, 4,077,090 and 4,164,057 and U.S. Reissue Pat. Nos. 30,265 and 30,390.

If the arrangement as shown in FIG. 4 is used to implement the invention as described herein, the quick connect means 46 would be used to connect magazine 43 to an appropriately modified stuffing horn assembly. The modification of the stuffing horn assembly, as shown in FIG. 5, includes extending the length of the stuffing horn 66 so that it extends through substantially the entire length of the mandrel 44, and providing a connector 68 for quick connection to the connector means 46. Other portions of the stuffing horn assembly, as shown, include a movable support sleeve 70 to which the sizing means 64 connects in a conventional manner.

In still another package arrangement, as shown in FIG. 6, the mandrel is an elongated tubular member 72 having a forward support portion 74 and a rearward support portion 76. Forward support portion 74 carries the ordered array of extender disc pairs A, B, C, etc., in an unshirred portion 78 of casing. The rearward support portion 76 carries a length of shirred tubular casing 80.

The shirred casing 80 on support portion 76 can be a cored high density shirred casing stick as more particularly described in a copending application Ser. No. 563,851 filed April 6, 1982. In a cored high density configuration, flexible tubular cellulosic food casing is shirred and compressed onto a rigid hollow tubular core to a high compaction condition. The resulting article is a casing stick with enhanced stuffing length capacity, structural stability and strength, and larger stuffing horn adaptability.

Fixed to the mandrel intermediate the forward and rearward portions 74 and 76, is a sizing means 82. While sizing means 82 can be a conventional sizing disc such as described in U.S. Pat. No. 4,007,761, a preferred sizing means is one having a convoluted outer perimeter, a detailed description of which is contained in a copending application Ser. No. 430,582.

The package as shown in FIG. 6 also utilizes a flexible overwrap 90 to insure the ordered integrity of the array of extender disc pairs A, B, C, etc., instead of a rigid sleeve. A typical overwrap comprises an elastic tubular film such as a polyvinylchloride or polyethylene film.

If a flexible tubular film is used, as opposed to the rigid sleeve 56 of FIGS. 1-4, its rearward end 92 should be tethered to the mandrel by any suitable means such as a clamp 94. Its forward end 96 should have one or more longitudinal slits 98 (as best seen in FIG. 7) extending inward from the edge of the wrap and along the top of the wrap to a point adjacent the first extender pair B, in the array. These slits form a loose flap 97 which will allow the tilted extender disc pairs to pivot to an upright position through the wrap as is further discussed hereinbelow.

The portion of mandrel 72 comprising the elongated tubular member 74 can be elliptical in cross section for the same reason as described hereinabove with respect to mandrel 44. Also, the nose piece 95 of mandrel 72 is circular and includes a ramp portion 99. This ramp portion comprises a transition piece merging from the cross sectional shape of tubular member 74 into the circular shape of the nose piece adjacent the extender disc pair A.

In use, the magazine of the present invention, including its load of extender discs, is mounted onto a stuffing apparatus.

Preferably, the magazine is first incorporated into one or another of the prepackaged arrangements shown in FIGS. 4 or 6, prior to loading onto a stuffing apparatus.

The stuffing apparatus which can be employed in conjunction with the invention is preferably a modification of that set forth in U.S. Reissue Pat. No. 30,390. A more detailed description of an appropriately modified apparatus is contained in copending U.S. patent application Ser. Nos. 430,230 and U.S. Pat. No. 4,466,984.

For purposes of the present invention, it is sufficient to say that once the magazine is mounted, or is otherwise loaded onto the stuffing apparatus, the stuffing operation is started. Thereafter, stuffing will produce flat-ended, stuffed casing products continuously and automatically until either the supply of casing or the supply of extender discs is spent.

As set out hereinabove, the outside diameter of nosepiece flange 54 is small enough to pass a leading, or first extender disc 12 of each extender pair as may be moved to the outlet of the stuffing horn, yet is large enough to catch a trailing, or second extender disc 14 of each pair. This allows the first extender disc 12, of a disc pair A to locate slightly forward of flange 54 as shown in FIGS. 3 and 8.

When the stuffing operation starts, as described in the aforementioned Ser. Nos. 430,230 and 430,442, the food emulsion pumped through stuffing horn 66, passes axially through mandrel 44. Because the leading disc is located slightly forward of nosepiece 54, the product which is discharged through nosepiece 50 and into the casing, can also enter and pressurize the space 13 between the discs (FIG. 8).

The force exerted by the emulsion in space 13 causes the leading disc to separate from the trailing disc 14. As stuffing continues and the casing fills with emulsion, the leading disc 12 moves away from the trailing disc as shown in dotted line in FIG. 8. The trailing disc 14 remains against flange 54 and is held in this position by means on the stuffing apparatus, such as a split ring 72, the operation of which is more particularly described in the aforementioned application Ser. Nos. 430,230 and 430,442.

As stuffing continues, emulsion pressure causes the leading disc of the pair to continue to separate and move from the trailing disc until a desired length of stuffed product is formed having a flattened leading end. When the desired length is formed, the food emulsion pump is automatically shut off.

With the pump off, and the desired product length having been formed, the split ring 72 on the stuffing apparatus is moved to the left as viewed in FIG. 8 to push the trailing disc over flange 54 and off of the nose piece. In this way the flange acts as a means to control the release of the trailing disc from the nose piece.

It should be appreciated that the trailing extender disc 14 of pair A is connected by flexible tubular membrane 16 to the leading extender disc of the next pair of extender discs B (see FIG. 3). Consequently, as the trailing disc of pair A moves off the nose piece, the next pair B of extender discs is pulled partially free from its stored or nested position within sleeve 56 and towards the nose piece 50.

As the pair of extender discs B is pulled towards the nose piece 50, the pair begins to pivot to an upright position from its tilted position within sleeve 56. Since the front end 60 of the sleeve is cut away to form the angled exit as shown, the extender pair B can begin to pivot through the sleeve opening with little resistance. This same feature is accomplished in the embodiment of FIGS. 6 and 7 by providing slits 98 and the loose flap 97 which extend inward from the forward end of wrap 90 and along the top of the wrap to a point adjacent the first pair of extender discs B in the array. As the pair of extender discs begin to pivot, the flap 97 lifts to facilitate passage of the disc pairs through the forward end 96 of the flexible overwrap 90.

With the next pair of extender discs pulled out of sleeve 56 (or out of the flexible overwrap 90 in the case of FIG. 6), an appropriate positioning means (not shown) engages the disc pair through the casing for purposes of escorting the disc pair B on to the nose piece 50 and into an upright or ready-to-use position against the interrupted flange 54. In this manner the disc pair A as shown in FIG. 3, is replaced by disc pair B.

The trailing disc 14 of pair A, having been moved off of the nose piece, is tightly captured within the stuffed casing by clip closing the casing behind the trailing disc 14. A second clip is applied around the portion of unshirred casing 61 and membrane 16 which is in front of the the leading disc of the succeeding disc pair B. The clip closed casing is then severed between the clips to free the resulting stuffed product.

The stuffing apparatus is now ready to begin its next cycle wherein the food product as pumped through the stuffing horn is introduced between the leading and trailing extender discs of pair B. This operation will continue to automatically produce flat-ended encased stuffed products until the supply of casing and pairs of extender discs are spent.

Preferably, for continuous and automatic operation, the number of extender discs should be sufficient to provide a number of stuffed products of a desired length for any given commercial situation, taking into account the length of casing available and the length of the encased stuffed product required for a particular commercial operation. The required number of pairs of extender discs will be readily apparent to one of ordinary skill in the art. In this regard, the length of casing in the shirred stick can be varied based on a fixed number of disc pairs or the number of extender pairs can be varied based on a fixed shirred stick length. Typically, a casing having a stuffed diameter of about 4.5 inches and an unshirred casing length of 200 feet might employ a magazine containing 50 pairs of extender discs.

While a preferred embodiment of the invention has been described, various modifications would be apparent to one skilled in the art. For example, the preferred embodiment is represented by a combination of an inner support member (tube or mandrel 44) and an outer support member (sleeve or housing 56). However, either member could be used independently and apart from the combination.

The outer support member 56 can function as a receptacle for holding the extender discs even if the inner support member is omitted. In such an arrangement, the circular extender discs can be stacked or arrayed in an outer support or receptacle which is elliptical in vertical cross section. An important aspect of this arrangement is the size relationship of the discs and receptacle. In this respect, the diameter of the circular discs is greater than the minor axis of the elliptical receptacle. This will force the discs to tilt to the required orientation in order to fit within the receptacle.

In use, the elliptical receptacle with its ordered array of tilted, circular discs, is loaded directly onto a stuffing horn wherein the horn extends through the disc array. In this manner, the horn itself functions as the inner support tube or mandrel.

This arrangement also requires that the quick-connect means 46 be part of the outer receptacle and that the stuffing horn have a detachable nose piece similiar in construction and function to the nose piece 50 described hereinabove.

Conversely, the inner support member 44 can function to support an array of tilted extender discs independently of the outer support member. Here, the circular extender discs can be stacked or arranged on an inner tubular support member or mandrel. An important aspect is that the size relationship of the disc opening and mandrel be such that the discs will tilt on the mandrel. Preferably this is accomplished by having the mandrel elliptical in cross section and the disc openings circular. However the same result could be obtained by making a circular disc opening larger than the cross section of the circular mandrel.

This arrangement requires that the quick-connect means 46 be part of the mandrel and that the mandrel have a shoulder or other member at its aft end to prevent the discs from the sliding rearward and off of the mandrel during handling.

In use, the mandrel with its ordered array of tilted discs can be mounted to a stuffing horn as is shown in FIG. 5.

Having thus described the invention in detail, what is claimed as new is:

1. A magazine for use in making stuffed casing products, said magazine comprising:
   (a) an elongated tubular mandrel having a fore end and an aft end;
   (b) a longitudinally extending outer support member disposed about at least a portion of said mandrel so the fore end of said mandrel extends out from a fore end of said support member, said outer support member being of a configuration sufficient to fit within a casing to be stuffed; and
   (c) said mandrel and outer support member defining a space therebetween which is open towards the fore end of said mandrel, said space being adapted to nest a plurality of generally flat annular discs received and stacked on said mandrel for movement along said mandrel in a direction out of said space and towards said fore end.

2. A magazine as in claim 1 including a connector means on said magazine for mounting said magazine to a casing stuffing apparatus so that the product to be stuffed passes axially out through said mandrel fore end.

3. A magazine as in claim 1 wherein said outer support member is a generally rigid sleeve supported from said mandrel adjacent the aft end thereof.

4. A magazine as in claim 1 wherein said outer support member is a sleeve which is generally elliptical in cross section, the minor axis thereof being smaller than the diameter of casing into which said magazine may be fitted.

5. A magazine as in claim 4 wherein the major axis of said sleeve is at least equal to the diameter of the casing into which said magazine may be fitted.

6. A magazine as in claim 4 wherein said sleeve is a rigid member having a fore end which is slanted rearwardly with respect to the longitudinal axis of said mandrel thereby defining an angled opening to said space.

7. A magazine as in claim 1 wherein said outer support member has an aft end which is at least partly closed to prevent the aft movement of discs nested within said outer support member.

8. A magazine as in claim 1 wherein said outer support member is a flexible tubular member having an aft end and an open front end.

9. A magazine as in claim 8, including means for tethering the aft end of said flexible tubular member to said mandrel.

10. A magazine as in claim 7 wherein said flexible tubular member has at least one longitudinal slit therein extending rearwardly from said front end to facilitate the passage through said front end of annular discs housed within said flexible tubular member.

11. A magazine as in claim 1 including a nose piece at the fore end of said mandrel, said nose piece having stop means for releasably retaining annular disc members on said mandrel.

12. A magazine as in claim 11 wherein said stop means is a flange at an end of said nose piece, said flange being larger than the opening through at least one of said annular disc members.

13. A magazine as in claim 12 wherein said flange is sufficiently flexible to permit the forcible movement of said one annular disc member over said flange.

14. A magazine as in claim 11 including cooperating attachment means on said nose piece and the fore end of said mandrel to permit attachment of said nose piece to said mandrel after the loading of annular disc members onto said mandrel.

15. A magazine as in claim 11 wherein said nose piece includes a body portion and a transition portion, said body portion having a cross sectional configuration different from the cross sectional configuration of said mandrel and said transition portion has a smooth surface to provide a smooth transition from one configuration to the other.

16. A magazine as in claim 15 wherein said nose piece body portion and said mandrel are circular in cross section, and the diameter of said nose piece body portion is larger than the diameter of said mandrel.

17. A magazine as in claim 15 wherein said mandrel and nose piece body portion are, respectively, elliptical and circular in cross section.

18. A magazine for use in making encased food products having substantially flat leading and trailing ends, comprising:
   (a) an elongated tubular mandrel having a fore end and an aft end;
   (b) connector means for detachably mounting said mandrel to a stuffing apparatus such that the food product being stuffed passes through said mandrel and out said fore end;
   (c) an outer support member disposed about at least a portion of said mandrel, said support member and mandrel defining a space therebetween which is open towards said fore end, said support member being of a configuration sufficient to permit passage of a casing to be stuffed over and about said support member; and
   (d) a plurality of substantially flat annular discs stacked in an array one against another over said mandrel and into said space, said discs being movable from said array and along said mandrel from a first, stored position within said space, to a second, ready-to-use position out of said space and adjacent said fore end.

19. A magazine as in claim 18 wherein said outer support member is a sleeve which is generally elliptical in cross section and said annular discs are circular, said circular discs in said stored position being oriented slantwise on said mandrel so that the projection of said circular discs onto a plane perpendicular to the longitudinal axis of said tubular mandrel has a configuration similar to the generally elliptical cross section of said sleeve.

20. A magazine as in claim 19 wherein said sleeve is a rigid member having an open front end which is angled to correspond generally with the slanted orientation of said circular discs, said sleeve having a rear end which is supported by said mandrel.

21. A magazine as in claim 19 wherein said sleeve is a flexible, tubular sleeve conforming generally to the shape assumed by said stack of slanted discs, said flexible tubular sleeve having an open front end and a rear end which is tethered with respect to said mandrel.

22. A magazine as in claim 18 including a nose piece for the fore end of said mandrel, said nose piece including means to facilitate the orientation and maintenance of said discs in a generally upright position when said discs are moved to said ready-to-use position.

23. A magazine as in claim 22 wherein said nose piece has a body portion which is larger in cross section than said mandrel, said larger cross section acting to facilitate the orientation and maintenance of said discs in a generally upright position when said discs are moved to said nose piece.

24. A magazine as in claim 23 wherein said nose piece includes a flange for preventing on said body portion for free sliding movement of at least one of said discs off of said mandrel.

25. A magazine for use in making encased food products having substantially flat leading and trailing ends, said magazine comprising in combination:
   (a) a longitudinally extending receptacle of a size sufficient to permit the passage of a casing to be stuffed over and about said receptacle;
   (b) said receptacle being generally elliptical in cross section and having an open fore end and a closed aft end, said aft end having a central opening therethrough;
   (c) a plurality of substantially flat, generally circular discs arranged in an ordered, stacked array within said receptacle, the diameter of each of said discs being greater than the minor axis of said elliptical cross section and less than the major axis of said elliptical cross section so that said discs are oriented within said receptacle at an angle to the longitudinal axis of said receptacle; and
   (d) each of said discs having a central opening aligned with the opening in said receptacle aft end, said aligned openings defining an axial passage extending through said aft end and stacked array.

26. A magazine as in claim 25 wherein said passage is adapted to receive a stuffing horn for mounting said receptacle and stacked array to a stuffing apparatus.

27. A magazine as in claim 25 including an elongated tubular mandrel extending axially through said receptacle aft end and the aligned openings in said discs, said receptacle aft end being attached to said mandrel.

28. A magazine for use in making encased food products having substantially flat leading and trailing ends, said magazine comprising in combination:
   (a) a plurality of substantially flat, generally circular discs arranged in a stacked array, each of said discs having a central opening and said openings being aligned to define a passage extending axially through said stacked array;
   (b) an elongated tubular mandrel extending through said passage for supporting said stacked array of discs, said tubular mandrel being adapted to mount to a stuffing apparatus so that the product to be stuffed passes through said tubular mandrel;
   (c) said mandrel being generally elliptical in cross section and each of said disc openings being generally circular, the size relationship of said elliptical cross section and the diameter of each circular opening being such that said stacked array will be maintained in a slanted orientation on said tubular mandrel with respect to the longitudinal axis of said tubular mandrel.

29. A magazine as in claim 28 including a sleeve member disposed about said mandrel, said sleeve having a closed aft end connected to said mandrel and an open fore end, said sleeve being generally elliptical in cross section, the diameter of each of said discs being greater than the minor axis of said sleeve cross section and less than the major axis of said cross section.

* * * * *

UNITED STATES PATENT AND TRADEMARK OFFICE
CERTIFICATE OF CORRECTION

PATENT NO. : 4,525,895

DATED : July 2, 1985

INVENTOR(S) : Vytas A. Raudys

It is certified that error appears in the above-identified patent and that said Letters Patent is hereby corrected as shown below:

In Col. 4, line 44, change "aforemention" to --aforementioned--.

In Col. 4, line 45, change "Pat. No. 4,466,984 It" to --Pat. No. 4,466,984. It--.

In Col. 8, line 20, change "Ser. No. 563,851" to --Ser. No. 363,851--.

In Col. 13, claim 24, lines 25 and 26 change "includes a flange for preventing on said body portion for free sliding movement" to --includes a flange on said body portion for preventing the free sliding movement--.

Signed and Sealed this

Nineteenth Day of November 1985

[SEAL]

Attest:

DONALD J. QUIGG

Attesting Officer

Commissioner of Patents and Trademarks